(12) United States Patent
Hunek et al.

(10) Patent No.: US 12,520,854 B2
(45) Date of Patent: Jan. 13, 2026

(54) SYSTEM FOR COOLING NON-LIQUID CONVEYABLE PRODUCT

(71) Applicant: PRAXAIR TECHNOLOGY, INC., Danbury, CT (US)

(72) Inventors: Balazs Hunek, Western Springs, IL (US); Michael V. Johnson, Naperville, IL (US); Elizabeth W. Wanic, Naperville, IL (US); Soujanya N. Jampala, Chicago, IL (US); Theodore H. Gasteyer, III, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 168 days.

(21) Appl. No.: 17/797,223

(22) PCT Filed: Mar. 4, 2021

(86) PCT No.: PCT/US2021/020827
§ 371 (c)(1),
(2) Date: Aug. 3, 2022

(87) PCT Pub. No.: WO2021/188302
PCT Pub. Date: Sep. 23, 2021

(65) Prior Publication Data
US 2023/0049923 A1 Feb. 16, 2023

Related U.S. Application Data

(60) Provisional application No. 62/990,001, filed on Mar. 16, 2020.

(51) Int. Cl.
*A23B 2/88* (2025.01)
*A23B 2/80* (2025.01)
(Continued)

(52) U.S. Cl.
CPC ............... *A23B 2/88* (2025.01); *A23B 2/803* (2025.01); *A23B 4/09* (2013.01); *F25D 3/11* (2013.01)

(58) Field of Classification Search
CPC . A23L 3/375; A23L 3/361; A23B 4/09; F25D 3/11
See application file for complete search history.

(56) References Cited

U.S. PATENT DOCUMENTS 6,308,529 B1 * 10/2001 Bass .................... F28F 5/06
62/63
2004/0255599 A1 * 12/2004 Moller .................. A23L 3/375
62/64

(Continued)

FOREIGN PATENT DOCUMENTS

CN 1971175 A 5/2007
DE 10123833 C1 * 1/2003 ........... A23B 4/0056

(Continued)

OTHER PUBLICATIONS

DE-10123833-C1 translation.*

*Primary Examiner* — Elizabeth J Martin
(74) *Attorney, Agent, or Firm* — Andrew G. Melick

(57) ABSTRACT

A system for providing a desired amount of cooling to a quantity of non-liquid conveyable product in a vessel within a given length of residence time including: (A) continuously feeding a mass of the product into, through and out of a vessel, at a rate that provides a predetermined length of residence time, wherein the product is moved through the vessel by engagement thereof with an impeller; and (B) feeding cryogen out of a plurality of nozzle openings directly into or onto the product in the vessel while the impeller is moving the product continuously past the nozzle openings, wherein the cryogen is fed into said non-liquid conveyable product from a sufficient number of nozzle (Continued)

openings to provide the desired amount of cooling to the product within the given period of residence time, and wherein the flow of cryogen out of each nozzle opening is continuous or intermittent.

20 Claims, 2 Drawing Sheets

(51) Int. Cl.
*A23B 4/09* (2006.01)
*F25D 3/11* (2006.01)

(56) References Cited

U.S. PATENT DOCUMENTS

| | | |
|---|---|---|
| 2006/0283195 A1 | 12/2006 | Rosenbaum et al. |
| 2006/0283196 A1* | 12/2006 | Rosenbaum .............. F25D 3/11 426/442 |
| 2008/0274250 A1 | 11/2008 | Taylor |
| 2019/0021349 A1* | 1/2019 | Israni ...................... A23L 3/375 |

FOREIGN PATENT DOCUMENTS

| | | |
|---|---|---|
| EP | 1734320 A2 | 12/2006 |
| EP | 1785043 A1 | 5/2007 |
| WO | 20170127125 A1 | 7/2017 |

* cited by examiner

SYSTEM FOR COOLING NON-LIQUID CONVEYABLE PRODUCT

RELATED APPLICATIONS

This application claims the benefit of International Application No. PCT/US2021/020827, filed on Mar. 4, 2021, which claimed the benefit of U.S. Provisional Application Ser. No. 62/990,001, filed on Mar. 16, 2020, which are incorporated herein by reference.

FIELD OF THE INVENTION

The present invention relates to equipment and methods for cooling non-liquid conveyable products such as ground meat in a continuous manner.

BACKGROUND OF THE INVENTION

In the commercial-scale preparation of non-liquid conveyable products, there can be stages in which the temperature of the non-liquid conveyable product increases. In such stages, the operator may wish to decrease the temperature or to prevent the temperature from increasing excessively. Lower temperatures are desirable to maintain the non-liquid conveyable products in sanitary condition, to avoid degradation of the physical characteristics of the non-liquid conveyable product, and to improve its processability and final product yield in subsequent unit operations. For example, the cutting and grinding operations that are performed in the production of ground meat or the mechanical separation of meat from bone may be expected to raise the temperature of the resulting ground or deboned meat product, and reducing the temperature of the ground or deboned meat product is highly desirable as soon as possible during or following the formation of the ground or deboned meat product.

Prior techniques for cooling non-liquid conveyable products have encountered drawbacks such as non-uniformity of cooling, as well as freezing of portions of the non-liquid conveyable product. High shear applied to some products can reduce non-uniformity but at the undesirable expense of deterioration of product texture. For other types of products, high shear promotes desirable effects in the resulting treated product. Also, prior techniques that use cryogenic coolant are costly in that they consume considerable amounts of the coolant as well as energy and time for a given amount of cooling. Indirect jacketed cooling options are limited in surface area for cooling heat transfer and cannot offer the intimate and direct contact offered by direct cryogen injection.

The present invention provides a system for cooling non-liquid conveyable product in a continuous manner that avoids non-uniformity; minimizes, controls and distributes cryogenic injection; avoids freezing of the non-liquid conveyable product; and imparts a desirable degree of high or low shear, as the case may be with the product being treated, while realizing unexpected efficiencies in cryogenic coolant and in time and energy requirements.

BRIEF SUMMARY OF THE INVENTION

One aspect of the present invention is a method for providing a desired amount of cooling to a quantity of non-liquid conveyable product in a vessel within a given length of residence time in the vessel, comprising:

(A) continuously feeding a mass of non-liquid conveyable product into a vessel, through the interior of the vessel, and out of the vessel, at a rate that provides a given predetermined length of residence time within the interior of the vessel, wherein the non-liquid conveyable product is moved through the interior of the vessel by engagement thereof with an impeller that is positioned in the interior of the vessel; and (B) feeding cryogen out of a plurality of nozzle openings directly into or onto the non-liquid conveyable product in the interior of the vessel while the impeller is moving the non-liquid conveyable product continuously past the nozzle openings, wherein the cryogen is fed into said non-liquid conveyable product from a sufficient number of said nozzle openings to provide the desired amount of cooling to the non-liquid conveyable product within the given period of residence time in the vessel, and wherein the flow of cryogen out of each nozzle opening is continuous or intermittent.

In a preferred embodiment of the invention, the impeller comprises elements which rotate about an axle, and the topmost surface of the non-liquid conveyable product in the interior of the vessel does not extend above the axle. In another preferred embodiment of the invention, the impeller comprises elements which rotate about an axle, and the topmost surface of the non-liquid conveyable product in the interior of the vessel extends as high as up to the highest point that the mixing element reaches.

In another preferred embodiment of the invention, the flow of cryogen out of the nozzles is intermittently interrupted by flowing nontoxic gas out of the nozzles into the non-liquid conveyable product.

DETAILED DESCRIPTION OF THE INVENTION

The present invention is useful for cooling any of a wide variety of non-liquid conveyable products. A product is considered to be non-liquid and conveyable for the purposes of the description and practice of this invention if it can be pushed through the vessel by the impeller as described herein, and is sufficiently viscous that it does not run out of the vessel in an uncontrolled fashion, whether in a single mass or a discrete, granular type product. As used herein, non-liquid conveyable products also have to be able to be penetrated by jets of cryogen, such as liquid nitrogen or solid carbon dioxide, directed at them or into them. Examples of non-liquid conveyable products include foods and non-foods, such as ground meat (which includes mixtures of ground meat with other ingredients), meat that has been deboned using mechanical or other means, protein pastes, compositions (such as batters) that can be solidified in subsequent processing steps (such as baking) to create products such as baked goods, cookies, kibbles such as pet foods, and the like. Plastic beads, flaked products, granolas, or plant products, such as hemp or hops buds, are also products that can be treated by this invention.

Figure 1:
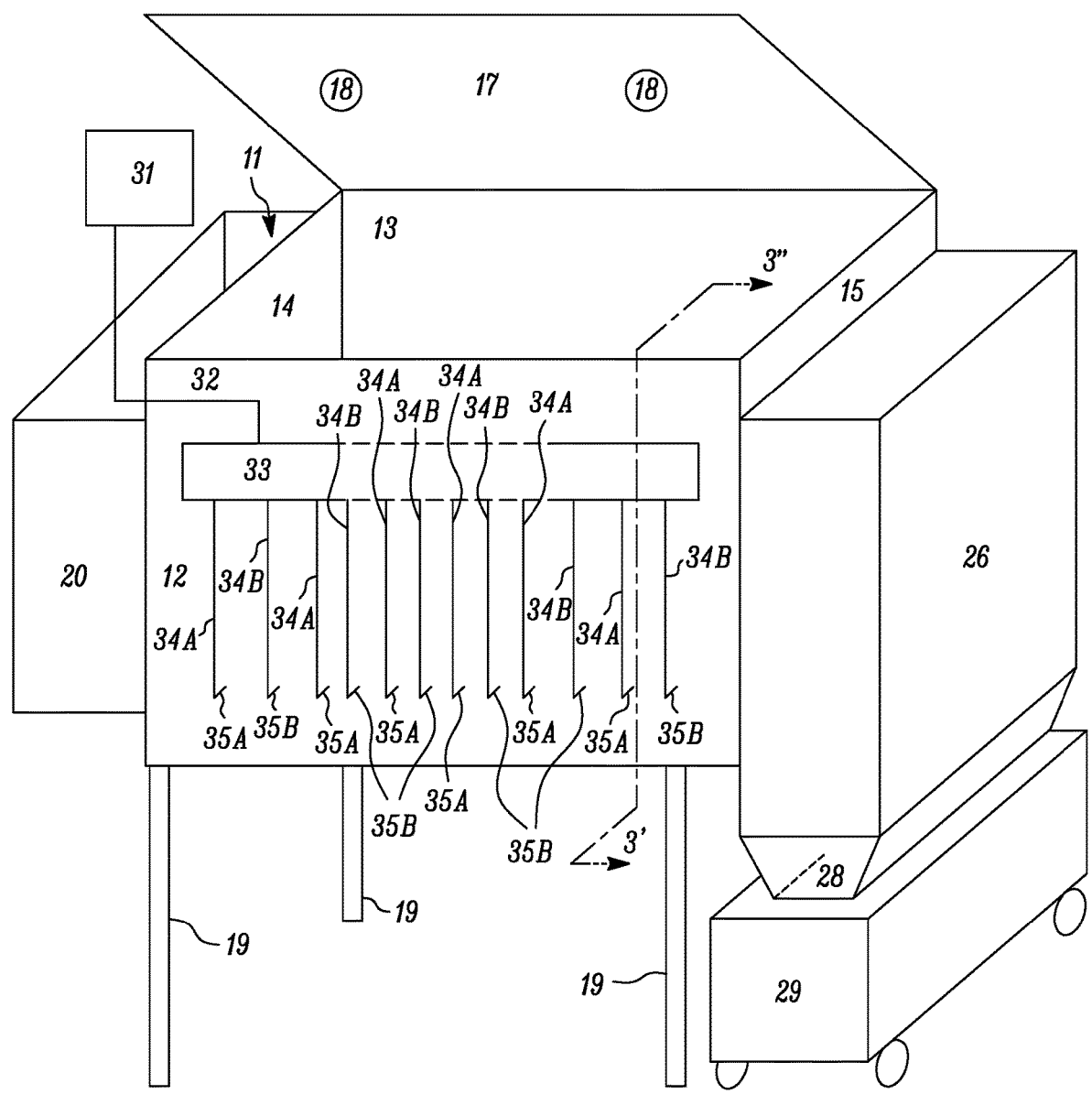
FIG. 1 is a perspective view of a device suitable for use with the present invention.

The present invention is advantageously employed using equipment that can receive and hold a quantity of the non-liquid conveyable product to be cooled, in which there is at least one impeller inside the equipment which can move the product within and through the equipment in a continuous or semi-continuous fashion. One example of such equipment is illustrated in FIG. 1, wherein vessel 11 comprises side walls 12 and 13, end walls 14 and 15, and bottom 16, all of which are sealed to each other to form an enclosure. Lid 17 is hingedly attached to one wall, such as wall 13 as shown, so that lid 17 can be closed over product within vessel 11 and can be raised to permit access to the interior of vessel 11. Lid 17 includes one or more vents 18 which can be opened or sealed, to permit vapor to be drawn out of the interior of vessel 11. The vessel 11 is supported on legs 19, and can be oriented anywhere between horizontal and vertical in arrangement, with product typically moving in one direction from the low point to the high point in the vessel. The product is fed into vessel 11 with an opening in lid 17 and the chilled product is discharged from the bottom of vessel 11 at the opposite side or end.

Inlet 10 is located in the lid 17 or the end wall 14 that is opposite from the discharge hopper 26. Preferably, inlet 10 is connected to a feed hopper 20 which can hold product that is to be fed into vessel 11. Discharge hopper 26 is a receptacle that can receive cooled product from the interior of vessel 11, through outlet 27. Discharge hopper 26 holds cooled product that is fed there from vessel 11, until doorway 28 in the bottom of discharge hopper 26 is opened at which point cooled product passes out through doorway 28 into a receptacle such as carrier 29 in which the cooled product can be held and moved to another location for further processing.

Figure 2:
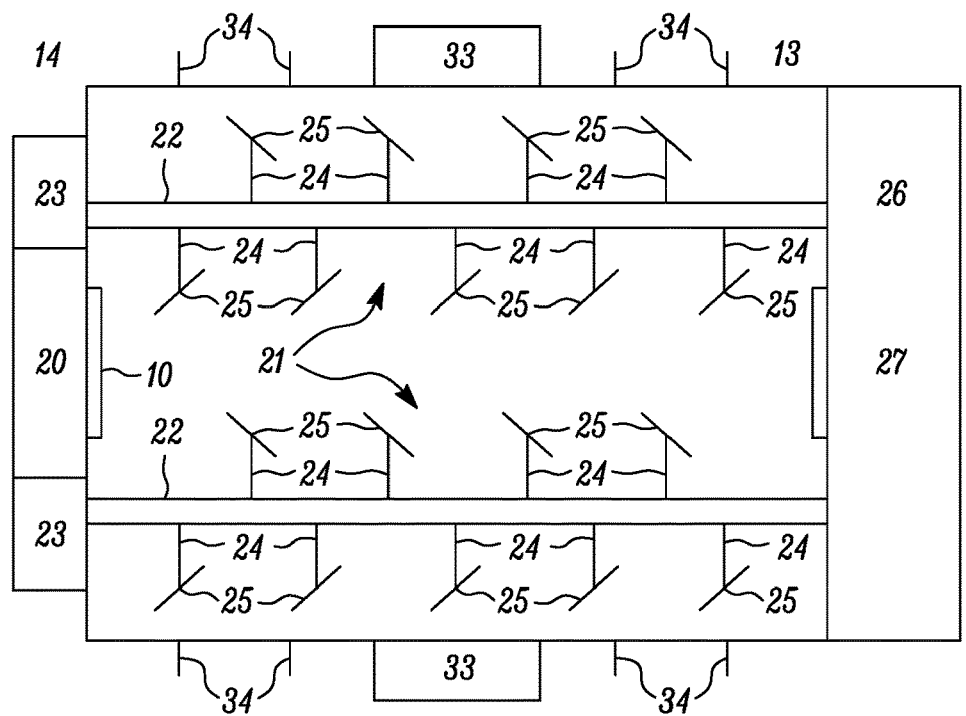
FIG. 2 is a top plan view of the device of FIG. 1.

Referring to FIG. 2, a pair of impellers 21 are shown. The invention can be practiced with embodiments having one impeller, or having two or more than two impellers. Each impeller 21 includes an axle 22 which is mounted in conventional manner in each end wall so that each impeller can be rotated around its axle. Each axle 22 is connected to a drive 23 that includes a motor and suitable connections from the motor to the axles 22 to enable the motor to rotate each axle. Drives 23 also include suitable controls to enable an operator to stop and start the rotation of the impellers and to regulate the speed at which the impellers 21 rotate.

The impellers 21 also include elements which, in operation, contact the non-liquid conveyable product and urge it in a direction generally parallel to the axles 22 while also mixing the product. In FIG. 2, each such element is a blade 25 which is attached to an axle by a radial arm 24, and the blades 25 are angled relative to the sides of the vessel 11. While one embodiment of blades is illustrated in FIG. 2, it will be understood that other configurations are also known and useable, such as ribbon-type and screw-type impellers and drives, to move the non-liquid conveyable product along the length of the vessel 11 from inlet 10 to (and out of) outlet 27.

The nozzle openings can be provided on one or both sides of the vessel 11, as shown in FIG. 2, to ensure uniformity of injection and cryogen contact.

Figure 3:
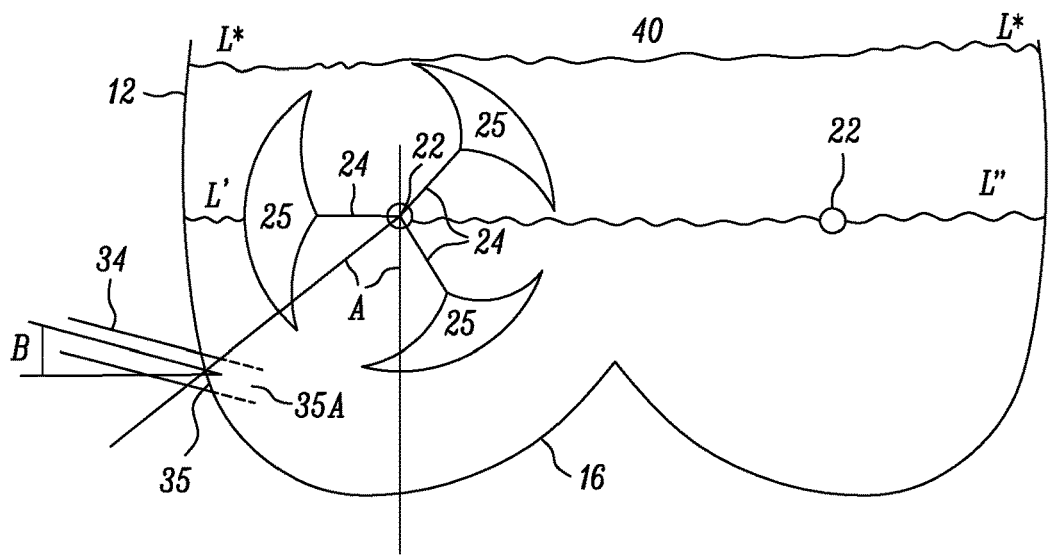
FIG. 3 is a cross-sectional view of a portion of the device depicted in FIG. 1, seen along the line 3'-3" that appears in FIG. 1.

FIG. 3 illustrates an end-on cross-sectional view of vessel 11 showing one set of blades 25 and radial arms 24. It is preferred that the edges of blades 25 that are farthest from axle 22 are near, but not touching, the inner edge of side wall 12. A nozzle opening 35, which is at the open end of a cryogen feed line 34, is situated flush with the inner surface of wall 12, or (as illustrated by phantom lines 35A) can be situated within the interior of vessel 11 provided that nozzle opening 35 does not contact blades 25 or any other part of the impeller. Contact between the ends of nozzle openings 35 and the blades of the impellers can be avoided by positioning the nozzle openings 35 between the geometrical planes within which the impellers rotate (in which case the nozzle openings 35 can protrude farther into the vessel interior), and/or by ensuring that nozzle opening ends which are in the plane within which the impeller blades rotate protrude not so far into the vessel that the impellers would hit them.

In one preferable orientation, the nozzle openings 35 are located slightly under the shaft level of the vessel, 1-2", on a downward angle of approximately 18-22° which is the preferred orientation for nozzles to inject cryogen that is carbon dioxide. This ensures the cryogen avoids shaft impingement and is introduced directly into or onto the product. Injectors for injecting liquid nitrogen (LIN) are preferably installed at a shallower angle, approximately 15°, at a position roughly 550 off the vertical, for injection into the product. That is, each nozzle opening 35 is preferably located so that the angle A between a vertical radius from the axle 22 of the impeller 21 that is closest to the nozzle opening 35, and the radius extending to the nozzle opening 35 from the axle 22 of the impeller 21 that is closest to the nozzle opening 35, is preferably from 50 to 60 degrees. In addition, each nozzle opening 35 should be oriented so that the angle B between the central axis of the nozzle opening and a horizontal line passing through the nozzle opening is preferably from 12 to 20 degrees. FIG. 3 illustrates this angled orientation. While FIG. 3 illustrates the preferred position of one cryogen nozzle opening 35 relative to the vessel, it should be understood that the vessel will include more than one such nozzle opening 35. A third possible embodiment utilizes a plurality of injector nozzles in, or just under, the lid of the vessel allowing for introduction of cryogen onto the product surface.

Referring again to FIG. 1, each cryogen feed line 34A is open at one end at nozzle opening 35A, and each cryogen feed line 34B is open at one end at nozzle opening 35B. Feed lines 34A and 34B are connected at their upstream ends to plenum 33 which is connected via line 32 to a source 31 of liquid cryogen such as an insulated tank. The liquid cryogen in the tank or other source 31 is typically at a pressure of 30 to 35 psig but can be as low as 25 psig and as high as 60 psig. Preferred cryogen includes liquid nitrogen and liquid carbon dioxide. The liquid nitrogen can comprise 100% liquid (that is, with no vapor fraction present), the benefits of the present invention can be realized when some of the cryogen is in the vapor phase together with the balance being liquid. However, at least 70% of the cryogen by weight should be liquid, and preferably at least 90% and more preferably at least 95%, by weight should be liquid, as the benefits of the present invention generally increase with higher liquid content of the cryogen that is fed into the vessel 11.

Cooling in the continuous process of the present invention is preferably achieved by varying the flow of cryogen out of the nozzles into the product. Flow can be varied in any or more of various ways, including:

Varying how much cryogen is flowed out of different nozzle openings. One way to achieve this is to provide each cryogen feedline 34A and 34B with a controllable valve that can be adjusted by the operator to control how much cryogen flows through the feed line. Another way to achieve this is to provide different nozzle openings 35A and 35B with different diameters; preferably, the diameters decrease from one nozzle opening to the next in the direction in which the product is being passed through the vessel 11. A preferred maximum diameter is an inch, down to a preferred minimum diameter of one quarter of an inch or even as low as 0.03125 of an inch.

Varying whether cryogen is flowed out of a nozzle at all at any given point in time. That is, the flow out of any given nozzle opening is alternately turned on and off so that cryogen flows from some nozzle openings while it is not flowing from some other nozzle openings. One preferred embodiment is to have cryogen flowing out of some or all of the openings 35A and out of none of the openings 35B; and then alternating so that cryogen is flowing out of some or all of the openings 35B and out of none of the openings 35A. In this way, the operator is enabled to adjusting the injection locations to provide a modulated cryogen injection pattern by turning on and off locations to achieve the cooling required for a given product in the available geometry.

Reduction of the liquid portion (fraction) of the cryogen that is fed out of the nozzle openings can be avoided by minimizing the pressure drop encountered by the cryogen between its source 31 and the nozzle openings 35. Pressure drop can be minimized by minimizing the number of bends in the lines 32 and 34 and by employing piping and nozzle openings that are not excessively constricting and that preferably minimize restrictions to flow. Inner diameters for the lines 32 on the order of 1 to 4 inches, and on the order of half an inch for the lines 34, are preferred. Ideally, pressure drop between the cryogen source 31 and the nozzle openings 35A and 35B is no more than 10 psi (pounds per square inch) and preferably no more than 5 psi.

In operation, non-liquid conveyable product is fed into the vessel, preferably from hopper 20 as mentioned above. The lid 17 should be closed, and the impeller(s) 21 are operating. In one embodiment, the non-liquid conveyable product would not extend above the uppermost axle 22; referring now to FIG. 3, in which line L'-L" passes through the axles 22, the top surface of the product in vessel 11 should not extend above line L'-L". In another embodiment, the non-liquid conveyable product could extend above the uppermost axle 22 and line L'-L", but would not extend above the highest position that the mixing element 25 reaches, that is, not above line L*-L* seen in FIG. 3. In either embodiment, headspace 40 should remain which comprises only the ambient atmosphere and none of the conveyable product. Flow of cryogen is also initiated, immediately or after some period of non-liquid conveyable product conveyance, from the source through the plenum and the individual feed lines and out of each nozzle opening into the non-liquid conveyable product in the vessel. The non-liquid conveyable product is close to or in direct contact with the nozzle openings, so that cryogen emerges out of the nozzle openings either directly into or onto the non-liquid conveyable product, wherein the cryogen cools the non-liquid conveyable product by virtue of its low temperature, the cryogen vaporizes in contact with the non-liquid conveyable product to provide refrigeration via the heat of vaporization, and the resulting cryogen vapor cools by virtue of its still-low temperature. The cryogen just before it emerges from the nozzle openings is typically at a temperature on the order of −320 F to −100 F, depending on the cryogen that is being used.

It has surprisingly been determined that unexpectedly good efficiency of cooling is obtained by limiting the flow rate of cryogen from each nozzle opening into the non-liquid conveyable product in the vessel, and by not exceeding a maximum amount of refrigeration obtained via each nozzle opening from the cryogen that is fed from each nozzle opening. The maximum expressed as refrigeration is up to 1,900 BTUs (preferably up to 1,500) of refrigeration per minute per nozzle. Alternatively, adhering to a maximum amount of cryogen from each nozzle, as described more below, is likewise surprising and also accomplishes the results described herein. These findings are opposite to the conventional expectation in this field that increased cooling must be obtained by increasing the cooling rate and cryogen flow rate at each nozzle. This finding also enables the operator to obtain efficient, substantially uniform, and rapid cooling while avoiding freezing of the non-liquid conveyable product. That is, the non-liquid conveyable product remains conveyable as defined herein, even as cooling of the non-liquid conveyable product continues and its temperature decreases.

The cryogen injection scheme described herein lends itself to preserving the texture of the product being chilled, especially in proteinaceous product. The retention of protein structure can be characterized by e.g. visual observation, microscopy, hand feel or can be quantified e.g. in a texture analyzer by measuring the force required for a given penetration by comparing pre- and post-cooling results. Controlling the impeller speed allows control of the shear imparted, leading to the ability to maintain the required texture.

As an example, the effects of performing the continuous process of this invention can be characterized by a texture analyzer by measuring the force required for a penetration of Y mm before cooling the deboned protein (F1) and after cooling the deboned protein (F2) and the force difference of F1-F2 not to exceed X Newton after a minimum 10 F product cooling process, and depending on the product. An example of the results, with minimal difference between pre- and post-chilling can be seen in the image below. The continuous cryogenic cooling process and equipment can provide an operating ratio of up to 10 to 25 degrees Fahrenheit of product temperature decrease/product throughput range 5,000-12,000 lb/hr in a no longer than 10 foot production length. This can be extended to up to 20,000 lb/hr in a no longer than 12 foot production length. Typical applications, but not limiting, would see a vessel shaft speed of 0-15 rpm and a 10-30 second injection cycle to chill 5,000-20,000 pounds per hour. Monitoring these characteristics, and correlating them with the operating conditions such as impeller speed, cryogen temperature, and cryogen feed rates from each nozzle opening inti the product, enables the operator to optimize the operating conditions including the application of the desired degree of high or low shear to the product.

Efficient operation is produced by a combination of conditions. The impeller is operated at a rate that moves the non-liquid conveyable product past each nozzle opening rapidly enough to avoid freezing of the non-liquid conveyable product by its contact with the cryogen from the nozzle opening. The desired rate of movement of the non-liquid conveyable product can be achieved by controlling the rate at which the impeller rotates. Impellers such as those in typical commercial low shear use would be rotated at rates on the order of 3 to 15 rpm (rotations per minute), again with higher rates preferred although attention must be given to avoiding rates that are so high that the physical integrity or the quality of the non-liquid conveyable product is damaged (unless high shear is desired due to the context such as the properties of the product being treated). Effective rates of movement of the non-liquid conveyable product can readily be determined by evaluating whether or not the non-liquid conveyable product undergoes any stiffening due to the onset of freezing, under a given set of conditions of cryogen flow rate out of the nozzle opening and rate of movement of the non-liquid conveyable product past the nozzle opening.

In addition, another unexpected operating condition to attain the surprising improvement in cooling efficiency by the present invention is to limit the refrigeration that is provided out of each nozzle opening. This is provided by not exceeding a maximum of 1,900 (preferably a maximum of 1,500) BTUs of refrigeration to the non-liquid conveyable product per minute from the cryogen liquid delivered from each nozzle opening.

The heat to be removed during cooling of the non-liquid conveyable product in the vessel as the non-liquid conveyable product goes from thermodynamic state 1 to 2 is $\Delta H_f = H_{f2}(T_2, x_2) - H_{f1}(T_1, x_1)$ with units of BTU/lb or kJ/kg, where $H_f$ is the enthalpy of the non-liquid conveyable product, T is the temperature of the non-liquid conveyable product, and x is the phase or frozen fraction of the non-liquid conveyable product. The total amount of refrigeration required to be delivered to the non-liquid conveyable product during the cooling residence time of the non-liquid conveyable product in the vessel during continuous operation is $\Delta H_f m_f / \Delta t$ with units of BTU/min or kJ/min, where $m_f$ is the mass of the non-liquid conveyable product in the vessel, and $\Delta t$ is the cooling batch time for batch operation (or cooling residence time in the vessel for continuous operation). Refrigeration actually delivered into the non-liquid conveyable product by the cryogenic fluid directly injected inside the vessel to contact the non-liquid conveyable product is $m_e \eta_e$ with units of BTU/min or kJ/min, where $m_e$ is the mass flow rate of the cryogenic fluid (kg/min or lb/min), and $\eta_e$ is the cryogen refrigeration utilization efficiency (BTU/lb or kJ/kg).

The present invention has determined that this is generally achieved by not exceeding a flow rate of cryogen liquid into the non-liquid conveyable product in the range of 1 to 30, preferably 2 to 30, pounds of cryogen per minute per nozzle, 2 to 25 and preferably 5 to 25 pounds of cryogen/minute/nozzle, typically on the order of only about 2 to 15 and preferably 5 to 15 pounds of cryogen/minute/nozzle. Typical batch systems can see cooling rates as high as 225,000 BTUs/hr/nozzle, while the continuous vessel described here is limited to 2,500-30,000 BTUs/hr/nozzle. This plurality of nozzles approach ensures that the product is not over chilled, freeze ups are avoided, and cryogen carryover out of the exit is avoided, improving safety and downstream product quality.

The number of nozzle openings (as well as the number of feed lines feeding cryogen to the nozzle openings, the orifice sizes, and the number of plenums associated with the feed lines) will be determined by the overall desired amount of cooling to be provided to the quantity of non-liquid conveyable product being cooled, and by the length of time within which the cooling is to be achieved.

As one typical example, in a commercial 10,000 pound per hour vessel, satisfactory continuous high-efficiency cooling is provided to provide heat removal of up to 10 BTU/pound of non-liquid conveyable product, by adjusting and balancing the cryogen flow rates out of each nozzle opening, the number of nozzle openings, and the liquid content of the cryogen that is fed into the non-liquid conveyable product, and providing cryogen liquid as described herein through the nozzle openings into the non-liquid conveyable product.

The injection scheme which is discussed using $CO_2$ applies to liquid nitrogen injection systems as well. The preferred cryogen injection scheme involves splitting the injectors into two sets: Set 35A and Set 35B, illustrated in the image below. Injectors 35A and 35B are arranged in alternating sequence along the length of vessel 11, with rows of injectors on opposite sides. The alternating scheme ensures relatively even injection across the entire volume of product. The cycle time is determined based on the heat load required to be removed and the various orifice sizes. The total cycle time is divided into roughly three parts: Inject from Set A; Inject from Set B; and Rest without any cryogen injection. The lengths of time for each part are roughly in the ratio of: Set A, Set B, Rest as X:X:2X wherein X is in the range of 2 seconds to 10 minutes, preferably 5 seconds to 10 minutes, depending on the size of the vessel 11 and on the total mass of product being chilled in that vessel. The inclusion of the rest period during injection allows the injected cryogen to turn gaseous, and the refrigeration that it supplies to be mixed into, conduct into, and equilibrate into the product volume. The short injections prevent over-chilling of any given volume of product. The rest and equilibration periods allow for cold penetration without significant mixing and shear, helping to preserve product texture during the chilling process, and to avoid freezing of product onto the vessel walls and shaft. Other variations in pattern can be contemplated as warranted for some product mixtures.

What is claimed is:

1. A method for providing a predetermined amount of cooling to a quantity of non-liquid conveyable product in a vessel within a given length of residence time in the vessel, comprising:

(A) continuously feeding a mass of non-liquid conveyable product into the vessel, through the interior of the vessel, and out of the vessel, at a rate that provides a given predetermined length of residence time within the interior of the vessel, wherein the non-liquid conveyable product is moved through the interior of the vessel by engagement thereof with an impeller that is positioned in the interior of the vessel; and (B) feeding cryogen out of a plurality of nozzle openings directly into or onto the non-liquid conveyable product in the interior of the vessel while the impeller is moving the non-liquid conveyable product continuously past the nozzle openings, wherein the cryogen is fed into said non-liquid conveyable product from a sufficient number of said nozzle openings to provide the predetermined amount of cooling to the non-liquid conveyable product within the given period of residence time in the vessel, and wherein the flow of cryogen out of each nozzle opening is continuous or intermittent, wherein (i) flow of cryogen out of a nozzle opening in the plurality of nozzle openings is turned on while flow of cryogen out of another nozzle opening in the plurality of nozzle openings is turned off, and then (ii) flow of cryogen out of the nozzle opening is turned off while flow of cryogen out of the another nozzle opening is turned on, and wherein after step (ii), there is a rest period in which the flow of cryogen is turned off in both the nozzle opening and the another nozzle opening.

2. The method according to claim 1 wherein the impeller comprises elements which rotate about an axle, and the topmost surface of the non-liquid conveyable product in the interior of the vessel does not extend above the axle.

3. The method according to claim 1 wherein intermittently the flow of cryogenic liquid out of the nozzles is interrupted by flowing nontoxic gas out of the nozzles into the non-liquid conveyable product.

4. The method according to claim 1 wherein the impeller comprises mixing elements which rotate about an axle, and the topmost surface of the non-liquid conveyable product in the interior of the vessel does not extend above the highest point that the mixing element reaches.

5. The method according to claim 1 wherein the pressure drop between the cryogen source and the nozzle openings is no more than 10 pounds per square inch.

6. The method according to claim 1 wherein the maximum amount of refrigeration obtained from each nozzle opening is up to 1900 BTU's of refrigeration per minute per nozzle.

7. The method according to claim 1 wherein the flow rate of cryogen liquid into the non-liquid conveyable product is 1 to 30 pounds of cryogen per minute per nozzle.

8. The method according to claim 1 wherein the amount of cryogen out of each of the plurality of nozzle openings is independently controlled.

9. The method according to claim 1 wherein the amount of cryogen out of a set of more than one nozzle opening of the plurality of nozzle openings is controlled as a group and is controlled independently from other nozzle openings in the plurality of nozzle openings.

10. The method according to claim 1 wherein at least one nozzle opening of the plurality of nozzle openings has a diameter different from another nozzle opening.

11. The method according to claim 1 wherein the diameter of each nozzle opening in the plurality of nozzle openings decreases in size along the vessel in the direction that the non-liquid conveyable food product moves through the interior of the vessel.

12. The method according to claim 1 wherein in between steps (i) and (ii), there is a rest period in which the flow of cryogen is turned off in both the nozzle opening and the another nozzle opening.

13. A method for providing a predetermined amount of cooling to a quantity of non-liquid conveyable product in a vessel within a given length of residence time in the vessel, comprising:
   (A) continuously feeding a mass of non-liquid conveyable product into the vessel, through the interior of the vessel, and out of the vessel, at a rate that provides a given predetermined length of residence time within the interior of the vessel, wherein the non-liquid conveyable product is moved through the interior of the vessel by engagement thereof with an impeller that is positioned in the interior of the vessel; and
   (B) feeding cryogen out of a plurality of nozzle openings directly into or onto the non-liquid conveyable product in the interior of the vessel while the impeller is moving the non-liquid conveyable product continuously past the nozzle openings, wherein the cryogen is fed into said non-liquid conveyable product from a sufficient number of said nozzle openings to provide the predetermined amount of cooling to the non-liquid conveyable product within the given period of residence time in the vessel, and wherein the flow of cryogen out of each nozzle opening is continuous or intermittent,
   wherein (i) flow of cryogen out of some of the nozzle openings in the plurality of nozzle openings is turned on while flow of cryogen out of other nozzle openings in the plurality of nozzle openings is turned off, and then (ii) flow of cryogen out of the some nozzle openings is turned off while flow of cryogen out of the other nozzle openings is turned on,
   wherein after step (ii), there is a rest period in which the flow of cryogen is turned off in both the some nozzle openings and the other nozzle openings.

14. The method according to claim 13 wherein in between steps (i) and (ii), there is a rest period in which the flow of cryogen is turned off in both the some nozzle openings and the other nozzle openings.

15. The method according to claim 13 wherein the impeller comprises elements which rotate about an axle, and the topmost surface of the non-liquid conveyable product in the interior of the vessel does not extend above the axle.

16. The method according to claim 13 wherein intermittently the flow of cryogenic liquid out of the nozzles is interrupted by flowing nontoxic gas out of the nozzles into the non-liquid conveyable product.

17. The method according to claim 13 wherein the impeller comprises mixing elements which rotate about an axle, and the topmost surface of the non-liquid conveyable product in the interior of the vessel does not extend above the highest point that the mixing element reaches.

18. The method according to claim 13 wherein the maximum amount of refrigeration obtained from each nozzle opening is up to 1900 BTU's of refrigeration per minute per nozzle.

19. The method according to claim 13 wherein at least one nozzle opening of the plurality of nozzle openings has a diameter different from another nozzle opening.

20. The method according to claim 13 wherein the diameter of each nozzle opening in the plurality of nozzle openings decreases in size along the vessel in the direction that the non-liquid conveyable food product moves through the interior of the vessel.

\* \* \* \* \*